July 31, 1956     R. F. MOON     2,757,021
COMBINED LIFTING AND COUPLING TOOL FOR TRAILER HITCH
Filed March 17, 1954
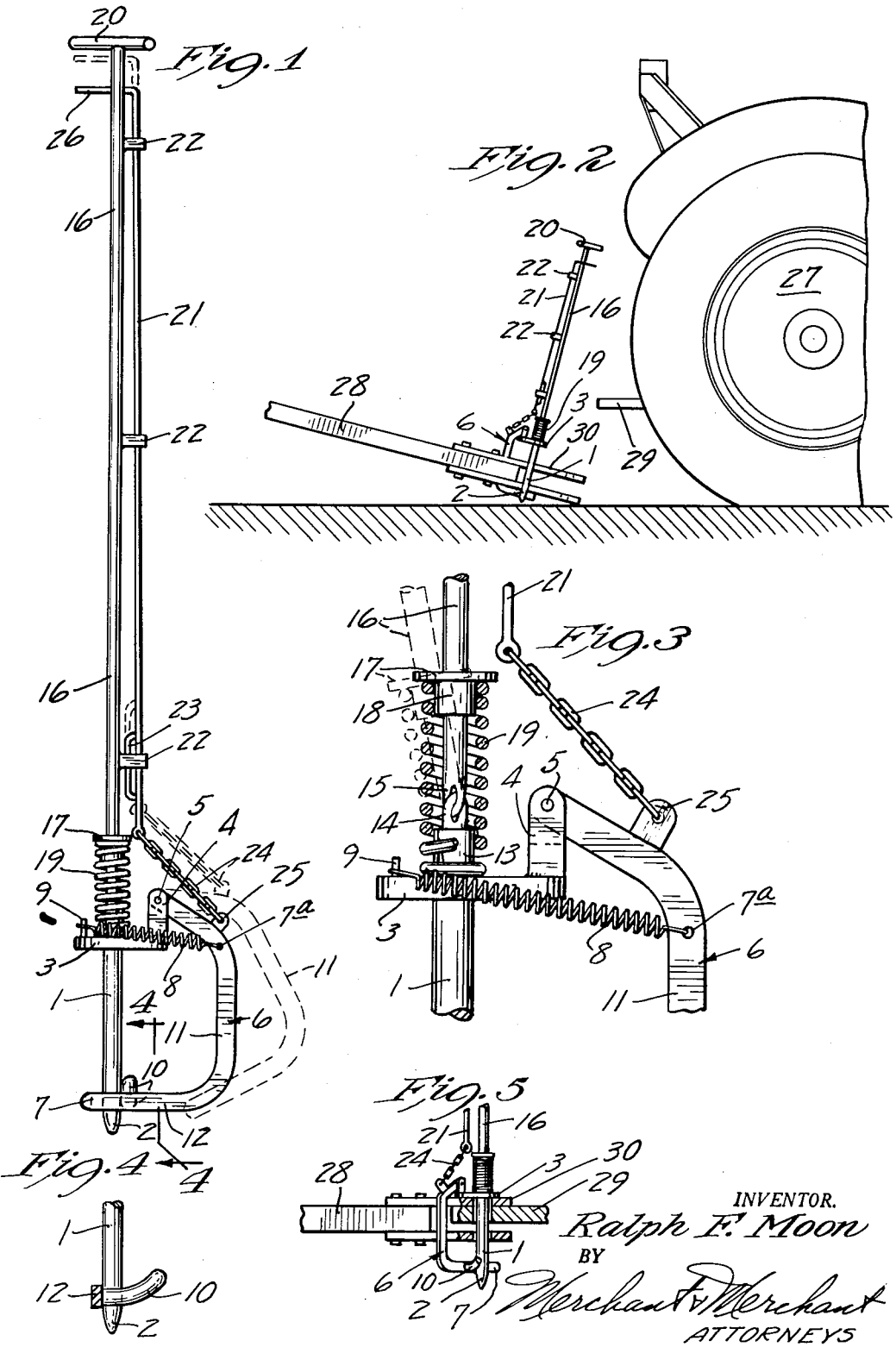
INVENTOR.
Ralph F. Moon
BY
Merchant & Merchant
ATTORNEYS United States Patent Office 2,757,021
Patented July 31, 1956

2,757,021

COMBINED LIFTING AND COUPLING TOOL FOR TRAILER HITCH

Ralph F. Moon, Garvin, Minn.

Application March 17, 1954, Serial No. 416,744

6 Claims. (Cl. 280—515)

My invention relates to coupling pins of the type utilized to detachably secure the tongues of mobile trailers to the drawbars of agricultural tractors and the like.

An important object of my invention is the provision of a coupler of the class described which not only will permit the operator of a tractor, while sitting in the seat thereof, to lift the tongue of a trailer from the ground, align the openings therein with the opening in the drawbar, but also thereafter to permit insertion of the coupling pin through the aligned openings.

A still further object of my invention is the provision of a device of the class immediately above described, which will automatically lock itself in operative position against accidental removal after same has been inserted through the aligned openings of the drawbar and trailer tongue.

I am aware that combined lifting and coupling tools of this nature are not broadly new. However, in structures of this character heretofore produced, the primary weakness lies in the fact that the elongated shank portions, which project upwardly between the tractor and the trailer when in use, too frequently become bent or damaged by impact with the trailer or material carried thereon. As a result the shanks become bent, broken, or otherwise rendered inoperative.

An important object of my invention is the provision of a device in which the elongated shank is universally pivotally connected to the coupler pin for rocking movements up to 90° and even more, without damage thereto.

A still further object of my invention is the provision of yielding means normally biasing the universally pivoted shank toward axial alignment wtih the coupling pin. To the above end, I provide a coil spring which is compressed between and encompasses adjacent ends of the universally connected operating shank and the coupler pin.

A still further object of my invention is the provision of a device of the class above described which is relatively inexpensive to construct, which is extremely easy to operate, and which is extremely rugged and durable in use.

The above and still further objects of my invention will become apparent from the following detailed specification, appended claims, and attached drawings.

Referring to the drawings wherein like characters indicate like parts through the several views:

Fig. 1 is a view in side elevation of my novel structure;

Fig. 2 is a fragmentary view in side elevation of a tractor and an implement tongue, illustrating the use of my novel device in elevating the tongue for attachment to an implement or trailer;

Fig. 3 is a fragmentary view, partly in side elevation and partly in section, corresponding to a portion of Fig. 1 on an enlarged scale;

Fig. 4 is a horizontal section taken substantially on the line 4—4 of Fig. 1; and Fig. 5 is a fragmentary view in side elevation illustrating the use of my novel device in coupling the tongue to a drawbar of a tractor, some parts being broken away, and some parts being shown in section.

Referring with greater particularity to the drawings, the numeral 1 indicates a conventional coupling pin having a relatively pointed lower end 2. At its upper end, the pin 1 is provided with an enlarged head 3 in the nature of a radially projecting flange. Pivotally secured to one side portion of the head 3 through the medium of an upstanding lug 4, as indicated at 5, is a generally L-shaped locking arm 6. The swinging movements of the locking arm 6 on the pivot axis 5 brings the free end 7 thereof toward and away from side by side relation with the locking pin 1 immediately above the pointed end 2 thereof, as indicated by the full and dotted lines in Fig. 1. A coil tension spring 8 interposed between the intermediate portion of lock arm 6, as indicated at 7a, and an upstanding apertured finger 9 on the head 3 biases the lock arm 6 toward a position to cause engagement of the stop finger 10 with the coupler pin 1, see particularly the full lines of Fig. 4. In its operative pin-locking position, it will be noted that the vertical portion 11 thereof is in spaced parallel relation with the lock pin 1, whereas the horizontal portion 12 thereof is in substantially right angle relationship thereto. This is important in that the elements in such position define a rectangular area of ample room to accommodate therein a tongue or drawbar of any reasonable size. See particularly Fig. 5.

As shown, particularly in Fig. 3, the head 3 is provided with an axially extended cross-sectionally circular boss 13 and a reduced upwardly projecting loop-forming end 14 which loosely receives the looped end portion 15 of an elongated shank 16. In closely upwardly spaced relation to the looped lower end 15 of the shank 16 is a circumferentially-extended annular flange 17 having an axial boss 18 which is identical to and opposes the boss 13 on the head 3. A coil compression spring 19 interposed between the head 3 and the flange 17, with its opposite ends receiving respectively the opposed bosses 13 and 18, biases the shank 16 toward axial alignment with the coupler pin 1 while permitting rocking movements of the shank 16 up to and even in excess of 90° of arc about the universal pivotal connection formed by the looped ends 14 and 15. At its extreme upper end the shank 16 is provided with a transversely extended handle 20.

An operating rod 21 is secured to the shank 16 for sliding movements longitudinally thereof by means of laterally projecting apertured ears 22 which receive said rod 21. Extreme sliding movement of the rod 21 in either direction is limited in a conventional manner by means of a stop member 23 carried by the lower end portion of the rod 21 and having sliding engagement with one of the ears 22. A flexible connection in the nature of a chain 24 is interposed between the lower end of the slide rod 21 and the locking arm 6 at a point outwardly of the pivotal connection 5, as indicated by the numeral 25. At its upper end the sliding rod 21 is provided with a handle portion 26 which is parallel to the handle 20 of the shank 16.

When it is desired to utilize my novel structure for the purpose of securing a tractor 27 to the tongue 28 of a trailer, not shown, the driver of the tractor 27 backs same to a position wherein the drawbar 29 closely overlies the bifurcated forward portion 30 of the tongue 28. He then leans backwardly, with my novel structure in hand, and brings clamping pressure between the handle elements 20 and 26 whereby to cause movement of same and of the locking arm 6 to the dotted line positions of Fig. 1. When the locking arm 6 is in this position it serves as a hook to insert under the tongue 28. After hooking engagement of the arm 6 with the tongue 28, the operator may, if he desires, release the handle 26 to cause complete encirclement of the tongue 28, as shown in Fig. 2, wherein the arm 6 is on one side of the tongue, the coupler pin 1 on the opposite side, and the horizontal portion 12 of the arm 6 underlying said tongue. In any event, the operator now lifts upwardly on the encompassed tongue through the shank 16 and positions the drawbar 29 between the bifurcated end portions 30 of the tongue 28 and by manipulation of the tractor 27 causes alignment to be brought about between the vertical apertures, not numbered, on the drawbar 29 and the bifurcated portions 30. Thereafter the coupler pin 1 is inserted through said aligned openings while the arm 6 is made to assume the dotted line position of Fig. 1. Thereafter release of the hand of the operator from the handle portion 26 of the sliding rod 21 will cause the arm to resume the locking full-line position of Fig. 1 under action of coil tension spring 8. Accidental removal of the lock pin 1 from the aligned openings in the drawbar 29 and tongue 28 is thereby positively prevented. On the other hand, it should be obvious that the shank 16 and operating rod 21 may be rocked about the universal pivotal connection formed by the elements 14 and 15 to as much as 90° and even more with respect to the coupler pin 1, without fear of damage thereto.

Also, preferably and as shown, the stop finger 10 projects laterally and upwardly for a distance greater than the thickness of the coupler pin 1, whereby to provide an independent hook element for lifting of tongues 28 or the like to a position to cause cooperative engagement therebetween and the drawbar 28 of the tractor.

My invention has been thoroughly tested and found to be completely satisfactory for the accomplishment of the above objects, and while I have disclosed a preferred embodiment thereof, it should be obvious that my invention is capable of modification without departure from the scope of the appended claims.

What I claim is:

1. In a device of the class described, a coupler pin having an enlarged head at its upper end, an angular locking arm pivotally secured at its upper end to said head for swinging movements of its free lower end towards and away from the lower end of said coupler pin, means yieldingly biasing said lock arm to move the lower end thereof toward the lower end of said pin, means limiting movement of said arm against the bias of said yielding means, an elongated shank pivotally connected to said head for universal movements, spring means biasing said shank toward axial alignment with said coupler pin, an operating rod secured to said shank for sliding movements longitudinally thereof, and a flexible connection between the lower end of said slide rod and said lock arm.

2. The structure defined in claim 1 in which said spring means includes a coil compression spring encompassing portions of said head and shank and extending above and below said pivotal connection.

3. The structure defined in claim 1 in which said spring means includes a coil spring compressed between said head and a flange on the lower end of said shank, said head and flange having opposed axial bosses receiving opposite end portions of said spring.

4. The structure defined in claim 1 in which said means limiting movement of said lock arm against bias of said yielding means comprises a stop finger which projects laterally and upwardly with respect to said coupler pin a distance greater than the transverse thickness of said coupler pin, whereby to provide a tongue-engaging hook.

5. In a device of the class described, a coupler pin, an angular locking arm operatively pivotally secured at its upper end to said pin for swinging movements of its free lower end towards and away from the lower end of said pin, means yieldingly biasing said locking arm to move the free lower end toward the lower end of said pin, an elongated shank, means including a coil spring connecting the upper end portion of said pin to the lower end portion of said shank for universal swinging movements, said coil spring urging said pin and shank toward an axially aligned relationship, an operating rod secured to said shank for sliding movements longitudinally thereof, and a flexible connection between the lower end of said operating rod and said lock arm.

6. The structure defined in claim 5 in further combination with a stop finger adjacent the free lower end of said locking arm, said stop finger projecting laterally with respect to said coupler pin a distance greater than the transverse thickness of said coupler pin whereby to provide a tongue engaging hook.

References Cited in the file of this patent
UNITED STATES PATENTS

| | | |
|---|---|---|
| 2,077,825 | Davidson | Apr. 20, 1937 |
| 2,180,558 | Stastny | Nov. 21, 1939 |
| 2,535,468 | Von Bank | Dec. 26, 1950 |